United States Patent
Voit et al.

(10) Patent No.: US 8,175,078 B2
(45) Date of Patent: May 8, 2012

(54) REDUNDANT PSEUDOWIRES BETWEEN ETHERNET ACCESS DOMAINS

(75) Inventors: Eric Voit, Bethesda, CA (US); William Mark Townsley, Nashville, TN (US)

(73) Assignee: Cisco Technology, Inc., San Jose, CA (US)

( * ) Notice: Subject to any disclaimer, the term of this patent is extended or adjusted under 35 U.S.C. 154(b) by 738 days.

(21) Appl. No.: 11/178,897

(22) Filed: Jul. 11, 2005

(65) Prior Publication Data

US 2007/0008982 A1   Jan. 11, 2007

(51) Int. Cl.
*H04L 12/28* (2006.01)
*G01R 31/08* (2006.01)

(52) U.S. Cl. ........ 370/351; 370/221; 370/225; 370/401; 370/256; 709/239; 709/220; 709/228; 709/205; 714/4

(58) Field of Classification Search .................. 370/351, 370/221, 217, 225, 228, 401, 238, 256, 395.53, 370/469, 420, 441, 395.54; 709/239, 208, 709/220, 221, 238, 227, 228, 237, 225, 205; 714/4
See application file for complete search history.

(56) References Cited

U.S. PATENT DOCUMENTS

| | | | |
|---|---|---|---|
| 5,331,637 A | 7/1994 | Francis et al. | |
| 5,818,842 A | 10/1998 | Burwell et al. | |
| 5,848,277 A | 12/1998 | Sheu | |
| 6,055,364 A | 4/2000 | Speakman et al. | |
| 6,073,176 A | 6/2000 | Baindur et al. | |
| 6,078,590 A | 6/2000 | Farinacci et al. | |
| 6,188,694 B1 | 2/2001 | Fine et al. | |
| 6,301,244 B1 | 10/2001 | Huang et al. | |
| 6,304,575 B1 | 10/2001 | Carroll et al. | |
| 6,308,282 B1 | 10/2001 | Huang | |
| 6,373,838 B1 | 4/2002 | Law et al. | |
| 6,424,657 B1 | 7/2002 | Voit et al. | |
| 6,430,621 B1 | 8/2002 | Srikanth et al. | |
| 6,470,025 B1 * | 10/2002 | Wilson et al. | 370/462 |
| 6,484,209 B1 | 11/2002 | Momirov | |
| 6,502,140 B1 | 12/2002 | Boivie | |

(Continued)

FOREIGN PATENT DOCUMENTS

WO   WO 2007/031002 A   3/2007

(Continued)

OTHER PUBLICATIONS

Marc Lasserre et al., "Virtual Private LAN Services over MPLS", Mar. 2003, Internet Draft Document, pp. 4-22.*

(Continued)

*Primary Examiner* — Kwang B Yao
*Assistant Examiner* — Jamal Javaid
(74) *Attorney, Agent, or Firm* — Baker Botts L.L.P.

(57) ABSTRACT

A computer network includes first and second Ethernet access domain networks, each of Ethernet access domain networks including a user-facing provider edge (u-PE) device, and a stack group of network-facing provider edge (n-PE) devices coupled with the u-PE device, the n-PE devices running a bidding protocol to select one of the n-PE devices as a primary n-PE device for a single pseudowire connection path between the first and second Ethernet access domain networks. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

8 Claims, 4 Drawing Sheets

U.S. PATENT DOCUMENTS

| | | |
|---|---|---|
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,757,286 B1 | 6/2004 | Stone |
| 6,763,469 B1 | 7/2004 | Daniely |
| 6,785,232 B1 | 8/2004 | Kotser et al. |
| 6,785,265 B2 | 8/2004 | White et al. |
| 6,789,121 B2 * | 9/2004 | Lamberton et al. ........... 709/227 |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,521 B1 | 2/2005 | Kadambi et al. |
| 6,850,542 B2 | 2/2005 | Tzeng |
| 6,852,542 B2 | 2/2005 | Mandel et al. |
| 6,882,643 B1 | 4/2005 | Mauger et al. |
| 6,892,309 B2 | 5/2005 | Richmond et al. |
| 6,954,436 B1 * | 10/2005 | Yip et al. ...................... 370/254 |
| 7,009,983 B2 | 3/2006 | Mancour |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 | 10/2007 | Frietsch |
| 7,310,342 B2 | 12/2007 | Rouleau |
| 7,339,929 B2 * | 3/2008 | Zelig et al. ..................... 370/390 |
| 7,345,991 B1 * | 3/2008 | Shabtay et al. ............... 370/221 |
| 7,408,936 B2 | 8/2008 | Ge et al. |
| 7,466,703 B1 | 12/2008 | Arunachalam et al. |
| 2002/0032780 A1 | 3/2002 | Moore et al. |
| 2002/0087721 A1 | 7/2002 | Sato et al. |
| 2002/0156612 A1 | 10/2002 | Schulter et al. |
| 2002/0156919 A1 * | 10/2002 | Maeno .......................... 709/238 |
| 2002/0196795 A1 | 12/2002 | Higashiyama |
| 2003/0012183 A1 | 1/2003 | Butler |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 | 8/2003 | Lamberton et al. |
| 2003/0177221 A1 | 9/2003 | Ould-Brahim et al. |
| 2004/0095940 A1 | 5/2004 | Yuan et al. |
| 2004/0102182 A1 | 5/2004 | Reith et al. |
| 2004/0107382 A1 | 6/2004 | Doverspike et al. |
| 2004/0125809 A1 | 7/2004 | Jeng |
| 2004/0133619 A1 | 7/2004 | Zelig et al. |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0228291 A1 | 11/2004 | Huslak et al. |
| 2004/0233891 A1 | 11/2004 | Regan |
| 2004/0264364 A1 | 12/2004 | Sato |
| 2005/0007951 A1 | 1/2005 | Lapuh et al. |
| 2005/0025143 A1 | 2/2005 | Chen et al. |
| 2005/0030975 A1 | 2/2005 | Wright et al. |
| 2005/0044265 A1 | 2/2005 | Vinel et al. |
| 2005/0063397 A1 | 3/2005 | Wu et al. |
| 2005/0068972 A1 | 3/2005 | Burns et al. |
| 2005/0089047 A1 * | 4/2005 | Ould-Brahim et al. .. 370/395.53 |
| 2005/0099949 A1 | 5/2005 | Mohan et al. |
| 2005/0152370 A1 | 7/2005 | Meehan et al. |
| 2005/0157664 A1 | 7/2005 | Baum |
| 2005/0157751 A1 | 7/2005 | Rabie et al. |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0239445 A1 | 10/2005 | Karaogguz et al. |
| 2005/0249124 A1 | 11/2005 | Elie-Dit-Cosaque et al. |
| 2005/0286503 A1 | 12/2005 | Oda et al. |
| 2006/0007867 A1 | 1/2006 | Elie-Dit-Cosaque et al. |
| 2006/0092847 A1 | 5/2006 | Mohan et al. |
| 2006/0098607 A1 | 5/2006 | Zeng |
| 2006/0126496 A1 | 6/2006 | Filsfils et al. |
| 2006/0182037 A1 | 8/2006 | Chen et al. |
| 2006/0248277 A1 | 11/2006 | Pande |
| 2006/0285500 A1 | 12/2006 | Booth |
| 2006/0285501 A1 | 12/2006 | Damm |
| 2007/0076719 A1 | 4/2007 | Allan et al. |

FOREIGN PATENT DOCUMENTS

| | | |
|---|---|---|
| WO | WO 2008/089370 | 7/2008 |

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

Do-Wire Edge-to Edge (PWE3) Working Group, Simon Delord, UECOMM Philippe Niger, France Telecom; Yuichi Ikejiri, Yuichiro Wada, NTT Debor: "PWE3 Applications & OAM Scenarios; draft-delord-pwe3-oam-applications 02.txt" Standard-Working Draft, Internet Engineering Task Force, IETF, CH, No. 2, Oct. 1, 2005, XP015042128 ISSN: 0000-0004 abstract p. 10, paragraph 3 Section 3.1.1.1. on pp. 12-13; http://ftp.ist.utl.pt/pub/drafts/draft-delord-pwe3-oam-applications-02.txt.

Blunk et al. Draft RFC 2284—Extensible Authentication Protocol EAP, Feb. 2004; http://tools.ietf.org/html/draft-ietf-eap-rfc2284bis-09.

Light Reading, Inc., Distributed-Edge Artecture, Nov. 25, 2003.

Landron, Use of the IEEE Assigned Type Field with IEEE std 802.3, 1998 Edition Local and Metropolitan Area Networks, Apr. 16, 2004.

* cited by examiner

REDUNDANT PSEUDOWIRES BETWEEN ETHERNET ACCESS DOMAINS

RELATED APPLICATIONS

The present application is related to co-pending application Ser. No. 10/925,743 filed Aug. 25, 2004, and Ser. No. 10/857,716 filed May 28, 2004, both of which are assigned to the assignee of the present application.

FIELD OF THE INVENTION

The present invention relates generally to digital computer network technology; more particularly, to methods and apparatus for providing redundancy mechanisms for network connections.

BACKGROUND OF THE INVENTION

The performance of many applications benefit from being implemented over service provider networks that support multipoint network services. A multipoint network service is one that allows each customer edge (CE) end point or node to communicate directly and independently with all other CE nodes. Ethernet switched campus networks are an example of a multipoint service architecture. The multipoint network service contrasts with more traditional point-to-point services, such as hub-and-spoke network services, where the end customer designates one CE node to the hub that multiplexes multiple point-to-point services over a single User-Network Interface (UNI) to reach multiple "spoke" CE nodes. In a hub-and-spoke network architecture, each spoke can reach any other spoke only by communicating through the hub. Traditional network service offering to the end customers via wide area networks (WANs) such as Frame Relay (FR) and asynchronous transfer mode (ATM) networks are based on a hub-and-spoke service architecture.

Virtual Private Network (VPN) services provide secure network connections between different locations. A company, for example, can use a VPN to provide secure connections between geographically dispersed sites that need to access the corporate network. There are three types of VPN that are classified by the network layer used to establish the connection between the customer and provider network. Layer 1 VPNs are simple point-to-point protocol (PPP) connections such as leased lines, ISDN links, and dial-up connections. In a Layer 2 VPN (L2VPN) the provider delivers Layer 2 circuits to the customer (one for each site) and provides switching of the customer data. Customers map their Layer 3 routing to the circuit mesh, with customer routes being transparent to the provider. Many traditional L2VPNs are based on Frame Relay or ATM packet technologies. In a Layer 3 VPN (L3VPN) the provider router participates in the customer's Layer 3 routing. That is, the CE routers peer only with attached provider edge (PE) devices, advertise their routes to the provider, and the provider router manages the VPN-specific routing tables, as well as distributing routes to remote sites. In a Layer 3 Internet Protocol (IP) VPN, customer sites are connected via IP routers that can communicate privately over a shared backbone as if they are using their own private network. Multi-protocol label switching (MPLS) Border Gateway Protocol (BGP) networks are one type of L3VPN solution. An example of an IP-based Virtual Private Network is disclosed in U.S. Pat. No. 6,693,878. U.S. Pat. No. 6,665,273 describes a MPLS system with a network device for traffic engineering.

Virtual Private LAN Service (VPLS) is an emerging technology that addresses the need for Layer 2 multipoint VPN that connects multiple sites within a specific metropolitan geographic area. VPLS is an architecture that delivers a Layer 2 multipoint VPN service that in all respects emulates an Ethernet LAN across a wide metropolitan geographic area. All services in a VPLS appear to be on the same LAN, regardless of location. In other words, with VPLS, customers can communicate as if they were connected via a private Ethernet segment, i.e., multipoint Ethernet LAN services. VPLS thus supports the connection of multiple sites in a single bridged domain over a managed IP/MPLS network.

In typical VPLS architecture with an IP/MPLS service provider (SP) network core, the CE devices are connected to the service provider network via a PE device. (The connection between a CE-PE pair of devices is commonly referred to as a UNI.) Each PE-CE pair is shown connected by an Attachment Circuit (AC). An AC is the customer connection to a service provider network; that is, the connection between a CE and its associated PE. An AC may be a point-to-point connection on a physical interface, a PPP session from an L2TP tunnel, an MPLS Label Switched Path (LSP), or a virtual port, and may be any transport technology, i.e., Frame Relay, ATM, a VLAN, etc. In the context of a VPLS, an AC is typically an Ethernet port, in which Ethernet serves as the framing technology between the CE device and the PE router. CE devices can also be connected through several edge domains, also known as access domains, which are interconnected using an MPLS core network. Such access domains can be built using Ethernet switches and techniques such as VLAN tag stacking (so-called "QinQ" encapsulation). By way of example, each PE device in an access domain typically includes a Virtual Switch Instance (VSI) that emulates an Ethernet bridge (i.e., switch) function in terms of MAC address learning and forwarding in order to facilitate the provision of a multi-point L2VPN. In such networks, pseudowires (PWs) are commonly utilized to connect pairs of VSIs associated with different access domains.

A PW is a virtual connection between two PE devices which connect two ACs. Conceptually in context of the VPLS service, a PW can be thought of as point-to-point virtual link for each offered service between a pair of VSIs. Therefore, if each VSI can be thought of as a virtual Ethernet switch for a given customer service instance, then each PW can be thought of as a virtual link connecting these virtual switches over a Packet Switched Network (PSN) to each other for that service instance. During setup of a PW, the two connecting PE devices exchange information about the service to be emulated in order to be able to properly process packets received from the other end in the future.

Another type of provider provisioned VPN architecture that uses PWs is the Virtual Private Wire Service (VPWS). VPWS is a Layer 2 service that provides point-to-point connectivity (e.g., Frame Relay, ATM, point-to-point Ethernet) and can be used to create port-based or VLAN-based Ethernet private lines across a MPLS-enabled IP network. Conceptually, in the context of the VPWS service, a PW can be thought of as a point-to-point virtual link connecting two customer ACs. After a PW is setup between a pair of PEs, frames received by one PE from an AC are encapsulated and sent over the PW to the remote PE, where native frames are reconstructed and forwarded to the other CE. PEs in the SP network are typically connected together with a set of tunnels, with each tunnel carrying multiple PWs. The number of PWs setup for a given customer can vary depending on the number of customer sites and the topology for connecting these sites.

Similar to Ethernet switches, VPLS-capable PE devices are capable of dynamically learning the Media Access Control (MAC) addresses (on both physical ports and virtual circuits) of the frame packets they replicate and forward across both physical ports and PWs. That is, each PE device is capable of learning remote MAC addresses-to-PW associations and also learns directly attached MAC addresses on customer facing ports. To achieve this result, PE devices maintain a Forwarding Information Base (FIB) table for each VPN and forward frames based on MAC address associations. Another attribute of an Ethernet network is that frames with unknown destination MAC addresses are flooded to all ports.

For an Ethernet network to function properly, only one available path can exist between any two nodes. To provide path redundancy and prevent undesirable loops in the network domain topology caused by multiple available paths, Ethernet networks typically employ Spanning Tree Protocol (STP), or some variant of STP, e.g., MSTP or RSTP. (For purposes of the present application, STP and its variants are generically denoted by the acronym "xSTP".) Switches in a network running STP gather information about other switches in the network through an exchange of data messages called Bridge Protocol Data Units (BPDUs). BPDUs contain information about the transmitting switch and its ports, including its switch and port Media Access Control (MAC) addresses and priorities. The exchange of BPDU messages results in the election of a root bridge on the network, and computation of the best path from each switch to the root switch. To provide path redundancy, STP defines a tree from the root that spans all of the switches in the network, with certain redundant paths being forced into a standby (i.e., blocked) state. If a particular network segment becomes unreachable the STP algorithm reconfigures the tree topology and re-establishes the link by activating an appropriate standby path. Examples of networks that run STP are disclosed in U.S. Pat. Nos. 6,519,231, 6,188,694 and 6,304,575.

A particular redundancy problem arises when Ethernet and STP are combined with pseudowires. Basically, when there are two or more pseudowires connecting different Ethernet access domains that independently run STP, broadcast and multicast packets can be replicated, and packets can be "looped back" across the core network through the pseudowires. The source of this problem is twofold: On one hand, STP is designed to build a path with no loops by disabling (i.e., blocking) any links which could forward traffic to the same destination. On the other hand, VPLS and Ethernet Relay Service (ERS) applications, which use VLAN tags to multiplex several non-same-destination pseudowires to a single port, assume that a full mesh of PWs connecting all involved PEs is the most efficient network topology. (Loops are dealt with in VPLS and ERS via a mechanism known as "split-horizon".)

One possible solution to this problem is to devise a mechanism for running STP over pseudowires; however, this approach is considered too unwieldy and difficult to implement. Another proposed architectural solution is to utilize only a single PW that connects different Ethernet access domains across the core network. The primary drawback of this latter approach is that it means that it installs a single point of failure in network connections. In other words, if the PW connection fails or if the associated PE devices in the access networks fail, end-to-end connectivity is defeated.

Thus, there is an unsatisfied need for alternative network architectures and topologies that overcomes the shortcomings of the prior art.

By way of further background, U.S. Pat. No. 6,073,176 discloses a multi-chassis, multi-link point-to-point protocol (PPP) that uses Stack Group Bidding Protocol (SGBP) to conduct multi-link PPP sessions for links that either originate or terminate on different systems. Historically, SGBP has been used for dial-up customer (UNI) facing interfaces to allow network servers to be stacked together and appear as a single server, so that if one server fails or runs out of resources, another server in the stack can accept calls. For instance, U.S. Pat. No. 6,373,838 teaches a dial-up access stacking architecture (DASA) with SGBP that implements a large multi-link dial port in which multiple communication links from one site are established to stack group members that operate together as a multi-link bundle.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A network architecture that provides redundant pseudowires between Ethernet access domains without replicated broadcast and multicast packets, "loopbacks", or a single point of failure is described. In the following description specific details are set forth, such as device types, protocols, configurations, etc., in order to provide a thorough understanding of the present invention. However, persons having ordinary skill in the networking arts will appreciate that these specific details may not be needed to practice the present invention. Practitioners in the network arts will further appreciate that the architecture of the present invention is useful for Ethernet Wire Service (EWS) applications, which emulate point-to-point Ethernet segments, as well as Ethernet Relay Service (ERS) applications, which use VLAN tags to multiplex several non-same-destination pseudowires to a single port.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. A wide area network (WAN) is a data communications network that spans any distance. Examples of the end nodes may include servers and personal computers. The nodes typically communicate by exchanging discrete frames or packets of data according to predefined protocols. In this context, a protocol consists of a set of rules defining how the nodes interact with each other.

Figure 4:
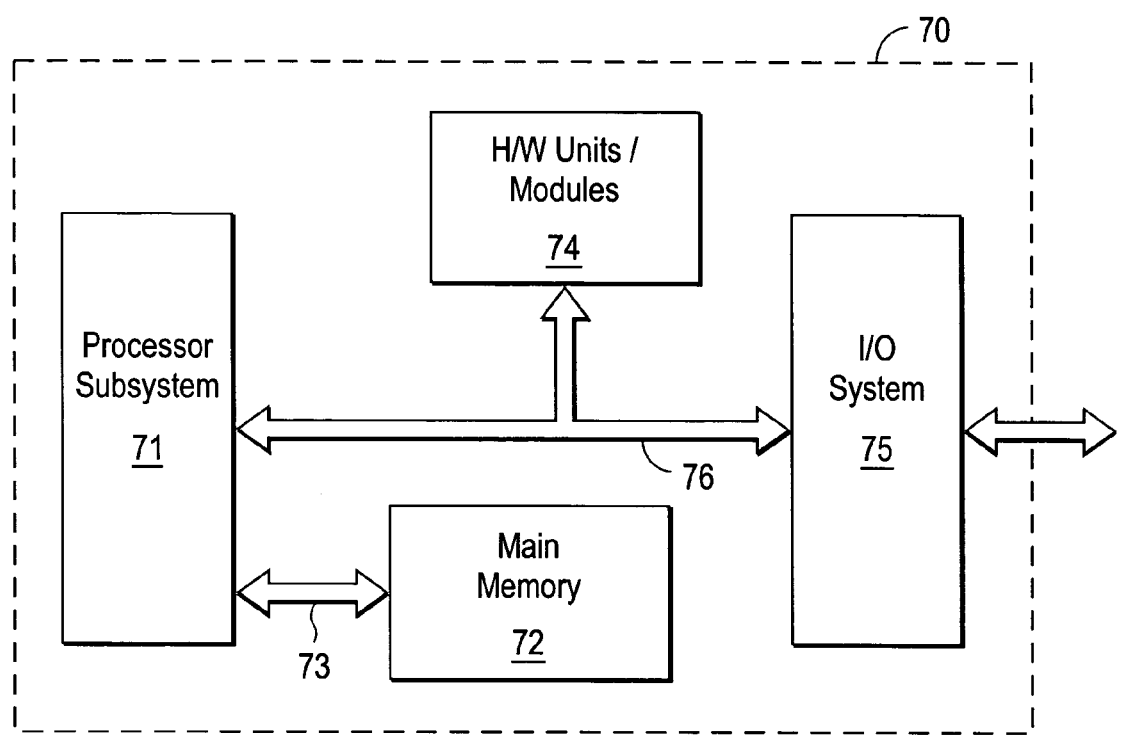
FIG. 4 is a generalized circuit schematic block diagram of a network node.

As shown in FIG. 4, each node 70 typically comprises a number of basic subsystems including a processor subsystem 71, a main memory 72 and an input/output (I/O) subsystem 75. Data is transferred between main memory ("system memory") 72 and processor subsystem 71 over a memory bus 73, and between the processor and I/O subsystems over a system bus 76. Examples of the system bus may include the conventional lightning data transport (or hyper transport) bus and the conventional peripheral component [computer] interconnect (PCI) bus. Node 70 may also comprise other hardware units/modules 74 coupled to system bus 76 for performing additional functions. Processor subsystem 71 may comprise one or more processors and a controller device that incorporates a set of functions including a system memory controller, support for one or more system buses and direct memory access (DMA) engines. In general, the single-chip device is designed for general-purpose use and is not optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

According to one aspect of the present invention, a network topology is provided in which WAN traffic flows on a single pseudowire between nodes (e.g., PE devices such as routers or switches) associated with different access domains for a specific VLAN. Rather than a full mesh of PWs spanning across the SP core network, only one path across the core network exists per VLAN. In the event of a failure of the PW connection, e.g., one of the PE devices fails, or if the primary WAN router changes, an alternative PW is activated as a redundant path.

In accordance with one embodiment of the present invention, activation of a redundant PW path is achieved by having multiple PE devices in each access domain, with the PE devices being grouped in a stack. A protocol similar to SGBP ("SGBP-like") runs on one or more processors of the PE devices in each group such that each PE device is aware of which device in the group operates as a primary or backup connection device for any particular link. In the context of the present application, a stack group is defined as a collection of two or more nodes or devices configured to operate as a group in an Ethernet access network. The devices in the stack group support a single PW connection across a core network to another stack group associated with a different Ethernet access network.

Figure 1:
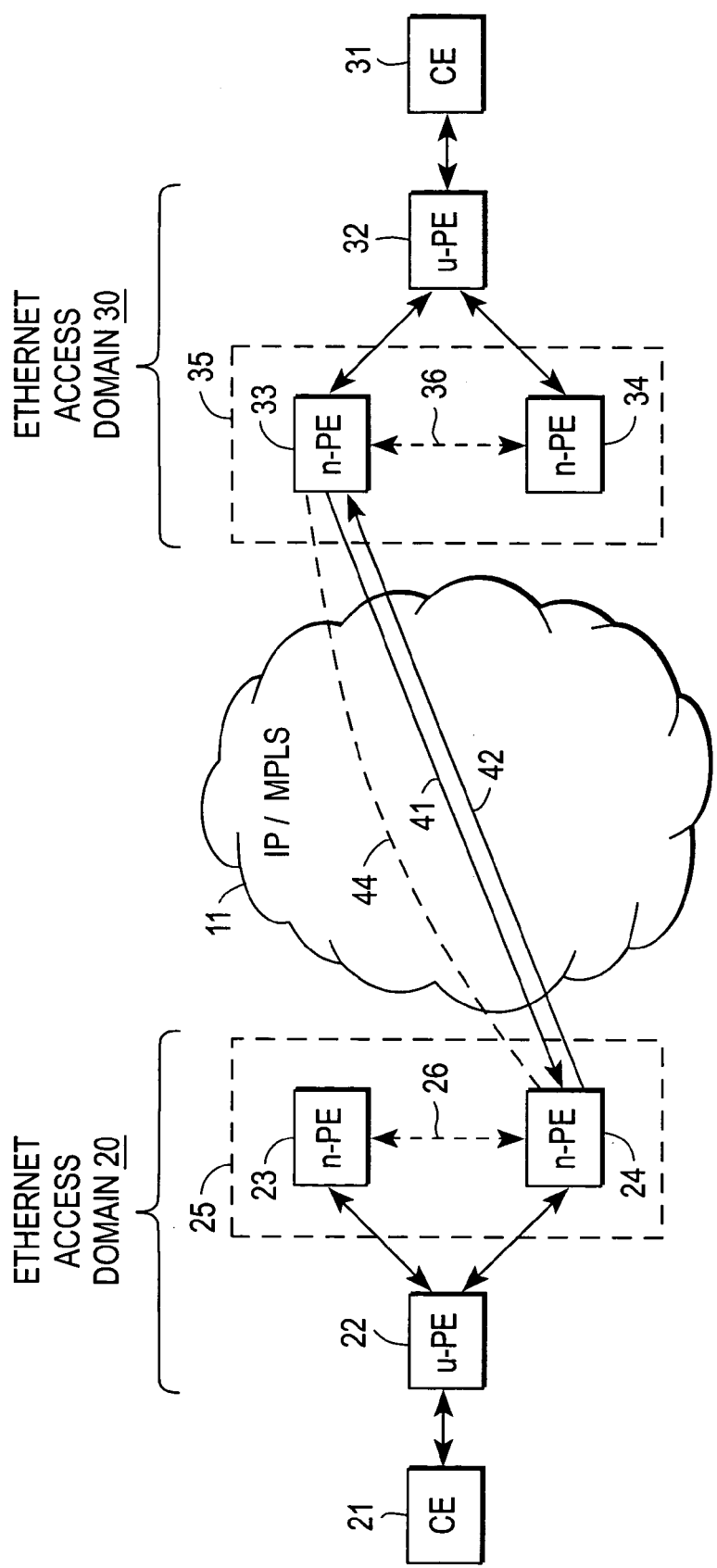
FIG. 1 illustrates one aspect of an exemplary VPLS system with an IP/MPLS core network and separate access network domains in accordance with one embodiment of the present invention.

FIG. 1 illustrates a basic network topology according to one embodiment of the present invention which includes independent Ethernet access domains 20 & 30 connected via a single path across a SP IP/MPLS core network 11. In this example the path across the core is shown by a single PW 44 that connects core network-facing provider edge (n-PE) devices 24 & 33, which are respectively associated with stack groups 25 & 35 of access domains 20 & 30. Each stack group 25 & 35 is shown including a second, redundant n-PE device 23 & 33, respectively, although there is no limit on the number of n-PE devices that may be included in a stack group. Devices 23 & 24 and 33 & 34 are typically edge routers or switches capable of running a protocol to set up PW connections. The n-PE devices 23 & 24 of access domain 20 are connected with a user-facing provider edge (u-PE) device 22, which, in turn, connects with a CE device 21. On the other side of core network 11, n-PE devices 34 & 35 of access domain 30 are connected with u-PE device 32, which is connected with CE device 31.

In accordance with the example of FIG. 1, multiple originating end n-PE devices of a stack group in an access domain bid for the right to create a unidirectional Ethernet pseudowire connection across the core network. A similar bidding process allows for a return pseudowire connection to be created. In other words, a single stack group of potentially distributed nodes manages external connectivity. Bidding among nodes occurs independently in each stack group located on opposite sides of the core network, with a single connection path being established across the core between n-PE devices in their respective access domains. The use of a SGBP-like protocol running in the stack groups (represented in FIG. 1 by dashed lines 26 and 36) of the respective access domains insures redundancy in the event of a connection failure, as explained in more detail below.

In the example of FIG. 1, a bidding process within stack group 35 results in the selection of n-PE device 33 for sending a connection request out across the core network. The connection request, shown by arrow 41, is received by n-PE device 24 of stack group 25. Device 24 responds to the request by initiating a bidding process in stack group 25 to determine which n-PE device (i.e., as between devices 23 & 24) should create the tunnel connection across the core. After the bidding process in stack group 25 has finished, a response that indicates where the tunnel is to be established is sent back to access domain 33. In FIG. 1 this response is illustrated by arrow 42. As a result of the bidding processes in stack groups 25 and 35, a PW connection 44 is established between n-PE devices 24 and 33.

Once a connection path has been created across core network 11, the plurality of n-PE devices in each stack group continue to communicate with each other via "heartbeat" or "hello" messages which communicate the current state of each device in the group. That is, according to one aspect of the present invention a dynamic SGBP capability is first utilized to establish a connection path across the core network; then the same SGBP mechanism is utilized to continually monitor traffic and maintain the PW connection in real-time based on VLAN activity. For example, if a particular device in the stack group fails, or it is determined that a PW connection should be moved to another n-PE device for load-balancing purposes, a backup connection path is dynamically established through the bidding mechanism, thereby providing redundancy in the SP pseudowire core.

Practitioners in the arts will appreciate that existing SGBP code created for dial-up interfaces may be used or modified for selection of a primary WAN router (i.e., n-PE device) for a VPLS/VSI or VPWS instance. It should be further understood that in the implementation described above, there is one SGBP-based redundancy state machine per n-PE device. In other words, one SGBP process may handle bids for multiple VPLS or VPWS PWs. Additionally, ordinary practitioners will appreciate that the SGBP bidding mechanism utilized in the present invention operates independently of any STP running to prevent loops within the access domain. Stated differently, there is no limitation against running STP in access domains 20 & 30 of the network topology shown in FIG. 1.

The bidding process that happens in each stack group—whether it is for initiating a connection, responding to a connection request, or to re-establish a failed connection—is essentially a negotiation among the multiple n-PE devices in the associated stack group to determine which device has the highest priority for handling a particular establishment. The priority criteria, for example, may include load-balancing considerations, the number of links or volume of traffic a particular device is currently handling, etc. The bidding could also use existing data in the n-PE devices, such as which n-PE device is the root for a spanning tree, in order to determine which device should handle a PW connection.

It is appreciated that a stack group name may be utilized for redundant devices to bid and load-balance links. The stack group name may be acquired from GARP (Generic Attribute Registration Protocol) VLAN Registration Protocol (GVRP). GVRP is a known application defined in the IEEE 802.1Q standard that allows for the control of 802.1Q VLANs, i.e., 802.1Q-compliant VLAN pruning and dynamic VLAN creation on 802.1Q trunk ports. GVRP basically allows a switch to exchange VLAN configuration information with other GVRP switches, prune unwanted VLANs and their associated broadcast, multicast, and unicast traffic, and dynamically create and manage VLANs on switches connected through 802.1Q trunk ports. GVRP In addition, a configured or automatically determined metric for each member of the stack group may be derived based on a variety of considerations, such as the number of active VPLS instances, which n-PE device is the root for a spanning tree, the number of pseudowires serviced, or the load on a particular physical layer link. In one embodiment of the present invention, the SGBP running in each stack group could utilize GVRP notifications as a mechanism for auto-discovery of remote access domains (i.e., islands). Stated differently, remote islands of interest may be discovered and identified via a GVRP process, or some GVRP derivative, instead of by manual configuration.

The VPN for each group of links bundles together may also be identified by a VSI that provides cross-domain communication, as defined in the IEEE 802.1ad and 802.1ah specifications.

Figure 2:
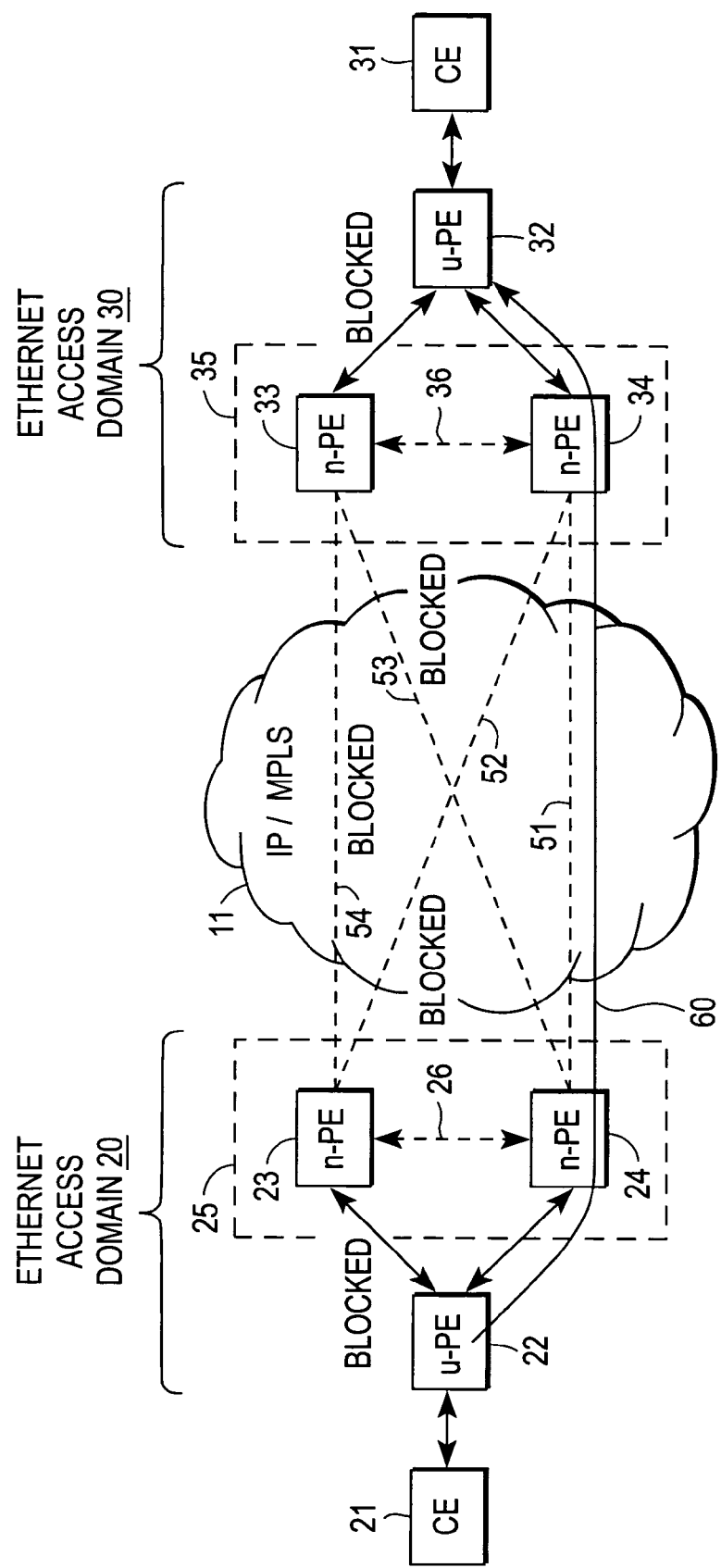
FIG. 2 illustrates another aspect of an exemplary VPLS system with an IP/MPLS core network and separate access network domains in accordance with one embodiment of the present invention.

FIG. 2 illustrates another aspect of an exemplary VPLS system with an IP/MPLS core network and separate Ethernet access network domains in accordance with one embodiment of the present invention. As previously stated, the network architecture of the present invention does not require a full mesh of PWs to be established between two access domains. Rather, PW connections are only established between those nodes that are active in a service instance at a particular time.

It is also possible, however, it to establish a full mesh of PWs between the n-PE devices of two different access domain networks, with only one PW being active between the primary n-PE devices. Such an implementation is shown in FIG. 2, wherein PW 51 provides the connection between primary n-PE devices 24 and 34. The end-to-end path across the full SP network, which includes access domains 20 & 30 and IP/MPLS core 11, is depicted by arrow 60 extending between u-PE devices 22 & 32. The remaining PWs 52-54 are shown in FIG. 2 as being blocked, which essentially means that there is no connection path or no PW that is active between the respective devices. Should the primary WAN router change, e.g., due to a failure occur that disables or terminates the PW connection 51, an alternative PW may be activated as a redundant path. That is, the SGBP mechanism described above dynamically operates to establish a new tunnel path (or re-establish the failed connection between n-PE devices 24 & 34) across core network 11.

Practitioners in the arts will further appreciate that it is not always necessary to have a PW connection established across core network 11. In other words, according to the present invention it is possible to implement a network in which the PW is created and maintained in real-time when there is active traffic in a particular VLAN or service instance across SP core 11. Alternatively, a PW connection may be established between access domains 20 & 30 and be left "up" regardless of VLAN traffic. That is, the network may be configured such that a single PW connection is maintained between provider edge routers for each service instance irrespective of current VLAN activity.

Figure 3:
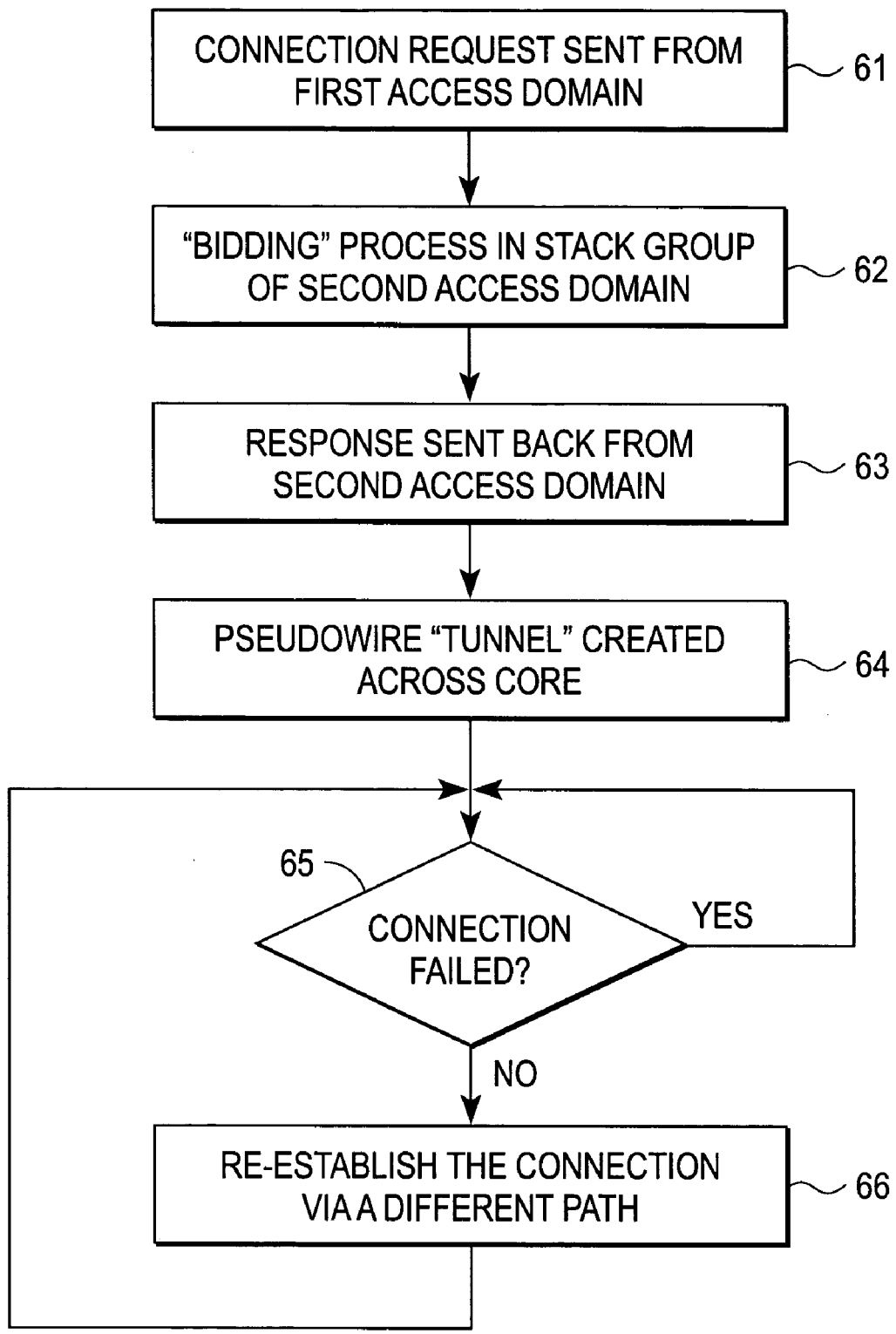
FIG. 3 is a flow chart diagram showing a method of operation in accordance with one embodiment of the present invention.

FIG. 3 is a flowchart diagram that illustrates a method of operation in accordance with another embodiment of the present invention. In the embodiment of FIG. 3, the process of establishing a connection path across the SP core network begins with the selection of a node for handling the PW connection from the stack group of a first access domain, followed by the sending of a connection request message to the stack group of a second access domain (block 61). Receipt of the connection request causes the stack group of the second access domain to initiate bidding for the establishment of the PW connection (block 62). After the bidding process ends with the selection of a node in the stack group for handling the connection, a response is sent back to the stack group of the first access domain (block 63). At this point, a PW "tunnel" for a VPLS instance is created through the SP core network (block 64).

Once a connection path has been established, a state machine running on a processor (or implemented in hardware or firmware) of each n-PE device in the respective stack groups performs real-time monitoring of the status of each device, as well as the PW connection (block 65). Monitoring continues until such time as the connection fails, or load-balancing concerns dictate changing the primary routing device, or some other consideration, at which time the PW connection is re-established via a potentially different path (block 66).

Although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer network comprising:
   first and second Ethernet access domain networks, each of Ethernet access domain networks including:
   a user-facing provider edge (u-PE) device;
   a stack group of network-facing provider edge (n-PE) devices coupled with the u-PE device, the n-PE devices running a bidding protocol to select one of the n-PE devices as a primary n-PE device for establishing only a single pseudowire connection path across a core network between the first and second Ethernet access domain networks per Virtual Local Area Network (VLAN) service instance, the bidding protocol running on a processor associated with each n-PE device and being operable to cause the n-PE devices in each stack group to establish a new single pseudowire connection path across the core network between the first and second Ethernet access domain networks responsive to either a failure in the single pseudowire connection path or load-balancing considerations, wherein at no time following the running of the bidding protocol is there more than one pseudowire connection path, whether active or inactive, established across the core network between the first and second Ethernet access domain networks per VLAN service instance.

2. The computer network of claim 1 wherein each n-PE device comprises a router.

3. A computer network comprising:
first and second Ethernet access domain networks, each of Ethernet access domain networks including:
a user-facing provider edge (u-PE) device;
a stack group of network-facing provider edge (n-PE) devices coupled with the u-PE device, each n-PE device including at least one processor that runs a bidding protocol to select one of the n-PE devices as a primary n-PE device for establishing only a single pseudowire connection path across a core network between the first and second Ethernet access domain networks per Virtual Local Area Network (VLAN) service instance, the bidding protocol further causing the n-PE devices in each stack group to select a redundant n-PE device for dynamically establishing a new single pseudowire connection path across the core network responsive to a failure of the single pseudowire connection path or due to load-balancing considerations, wherein at no time following the running of the bidding protocol is there more than one pseudowire connection path, whether active or inactive, established across the core network between the first and second Ethernet access domain networks per VLAN service instance.

4. The computer network of claim 3 wherein each n-PE device comprises a router.

5. The computer network of claim 3 wherein the core network comprises a Multi-protocol label switching (MPLS) network.

6. A computer network comprising:
first and second Ethernet access domain networks, each including:
a user-facing provider edge (u-PE) device;
a stack group of two or more network-facing provider edge (n-PE) devices coupled with the u-PE device, the two or more n-PE devices in the stack group configured to provision only a single pseudowire connection path, whether active or inactive, between the first and second Ethernet access domain networks across a core network, wide area network (WAN) traffic flowing between the first and Second Ethernet access domains only on the single pseudowire connection path per Virtual Local Area Network (VLAN) service instance;
each n-PE device includes at least one processor that runs a protocol to select one of the n-PE devices as a primary n-PE device for the single pseudowire connection path across the core network between the first and second Ethernet access domain networks, the at least one processor re-running the protocol to select a redundant n-PE device for provisioning a new single pseudowire connection path across the core network between the first and second Ethernet access domains responsive to a failure of the single pseudowire connection path or to load-balance the n-PE devices of the stack group, wherein at no time following selection of either the primary n-PE device or the redundant n-PE device is there more than one pseudowire connection path, whether active or inactive, provisioned across the core network between the first and second Ethernet access domain networks per VLAN service instance.

7. An Ethernet access network, comprising:
a plurality of network-facing provider edge (n-PE) devices connected in a stack group;
a user-facing provider edge (u-PE) device coupled with the stack group; and
wherein each of the n-RE devices in the stack group includes a processor that runs a stack group bidding protocol (SGBP) to select one of the n-PE devices as a primary n-PE device for establishing only a single pseudowire connection path across a core network to another Ethernet access domain, wide area network (WAN) traffic flowing between the Ethernet access network and the another Ethernet access domain only on the single pseudowire connection path per Virtual Local Area Network (VLAN) service instance, the SGBP also being operable to select a redundant n-PE device in the stack group for dynamically establishing a new single pseudowire connection path across the core network between the Ethernet access network and the another Ethernet access domain responsive to a failure of the single pseudowire connection path or to load-balance the n-PE devices of the stack group, and wherein at no time following selection of either the primary n-PE device or the redundant n-PE device is there more than one pseudowire connection path, whether active or inactive, established across the core network between the first and second Ethernet access domain networks per VLAN service instance.

8. The Ethernet access network of claim 7 wherein each of the n-PE devices comprises a router.

* * * * *